April 17, 1956     A. L. GRISÉ     2,742,320
HOSE MOUNTING FOR FLUID DISPENSING APPARATUS
Filed July 10, 1953     3 Sheets—Sheet 1

INVENTOR
ALFRED L. GRISÉ
BY *Chapin & Neal*
ATTORNEYS

April 17, 1956  A. L. GRISÉ  2,742,320
HOSE MOUNTING FOR FLUID DISPENSING APPARATUS
Filed July 10, 1953  3 Sheets-Sheet 2
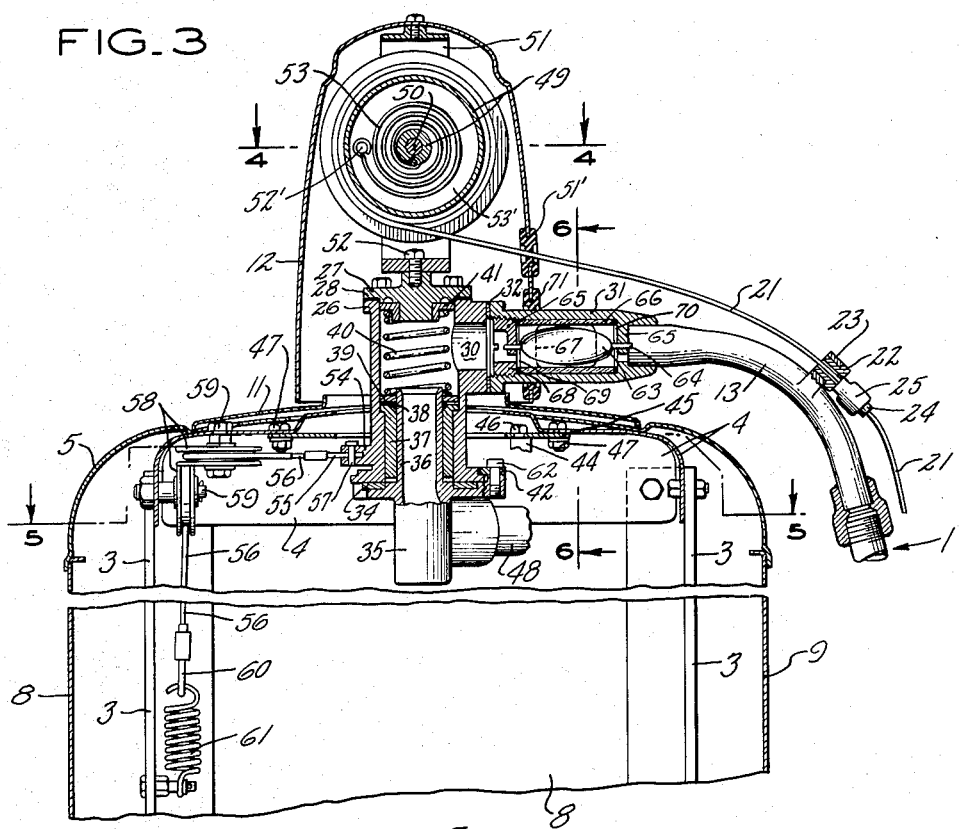
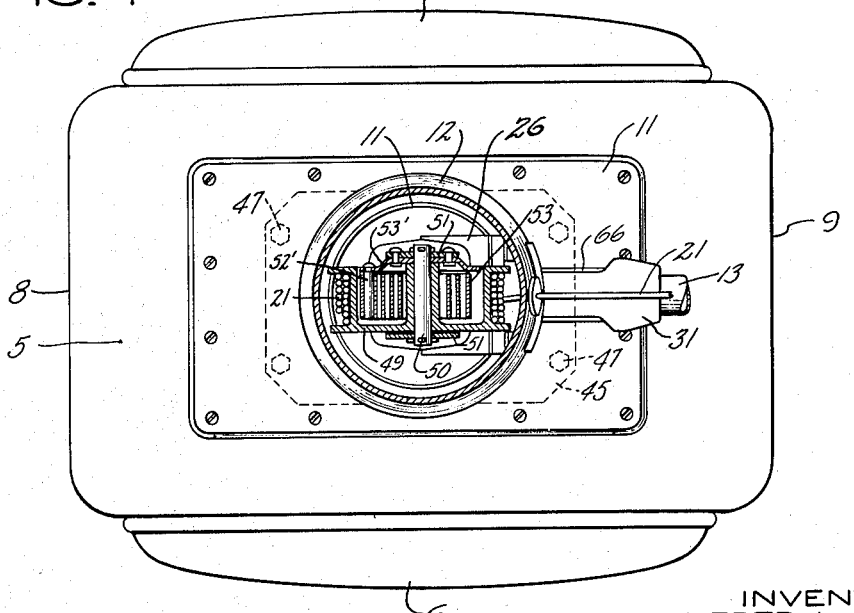
INVENTOR
ALFRED L. GRISÉ
BY Chapin & Neal
ATTORNEYS April 17, 1956  A. L. GRISÉ  2,742,320
HOSE MOUNTING FOR FLUID DISPENSING APPARATUS
Filed July 10, 1953  3 Sheets-Sheet 3

INVENTOR
ALFRED L. GRISÉ
BY Chapin & Neal
ATTORNEYS

United States Patent Office 2,742,320
Patented Apr. 17, 1956

2,742,320

HOSE MOUNTING FOR FLUID DISPENSING APPARATUS

Alfred L. Grisé, Springfield, Mass., assignor to Gilbert & Barker Manufacturing Company, West Springfield, Mass., a corporation of Massachusetts Application July 10, 1953, Serial No. 367,338

3 Claims. (Cl. 299—77)

This invention relates to an improved mounting for the flexible hose of a fluid dispensing apparatus.

The invention, while capable of general application, finds one advantageous use in connection with the pumps used at service stations for dispensing gasoline or other motor fuel to automotive vehicles.

The invention is an improvement on that disclosed in my prior Patent No. 2,340,217, granted January 25, 1944.

The invention has for an object the provision, in an apparatus of the class described that has a swinging, tubular, fluid-conducting arm, which is swivelled at one end to the pump housing and has its outer end adapted for connection to the inlet end of a hose in fluid-receiving relation, of a hose of extra length and means for supporting it from the swing arm so that it may be used in one or two sections, one such section being of sufficient length to service cars that are brought within the normal servicing range of the apparatus and the other such section being available by a pull on the hose to add to the first section, whenever necessary in order to reach a car located outside said range, the hose in its entirety being movable around the housing to any side thereof by pulling on the hose and swinging said arm.

Another object of the invention is to provide in apparatus of the class described, an extra long hose, longer than can be hung up in a single loop on a side of the housing, and to suspend this extra long hose at two points from a swinging, tubular, fluid-conducting arm, which has at one end a swivelled mounting on the pump housing, one such point being the inlet end of the hose, which is fixedly connected in fluid-receiving relation to the outlet end of the tubular swinging arm, and the other such point being intermediate the ends of the hose, where the connection to the swinging arm is made by a suspension wire, which is extensible outwardly relatively to the arm to allow outward displacement of the second point on the hose by a pull on the hose, whenever additional hose is necessary in order to reach a car parked beyond the usual service range, and which is normally held in a retracted position wherein only part of the hose is available for servicing cars located within the normal service range, all of the hose being movable around the pump housing to various angular positions on all sides of the pump housing.

Another object of the invention is to provide in an apparatus of the class described, having a portion of the dispensing hose between its inlet and outlet ends wound into a coil and yieldably held in such formation by suitable retracting means, a fluid-conducting arm swivelled on the pump housing for swinging movement about a vertical axis and having connected thereto said retracting means together with the inlet end of the hose, whereby both the arm and retracting means will swing into the direction in which the operator pulls the hose.

The invention will be disclosed with reference to one illustrative embodiment of it in the accompanying drawings, in which—

Fig. 3 is a fragmentary sectional elevational view, drawn to a larger scale and showing the mounting of the swing arm and the hose-retracting means;

Fig. 4 is a sectional plan view taken on the line 4—4 of Fig. 3;

Figure 1:
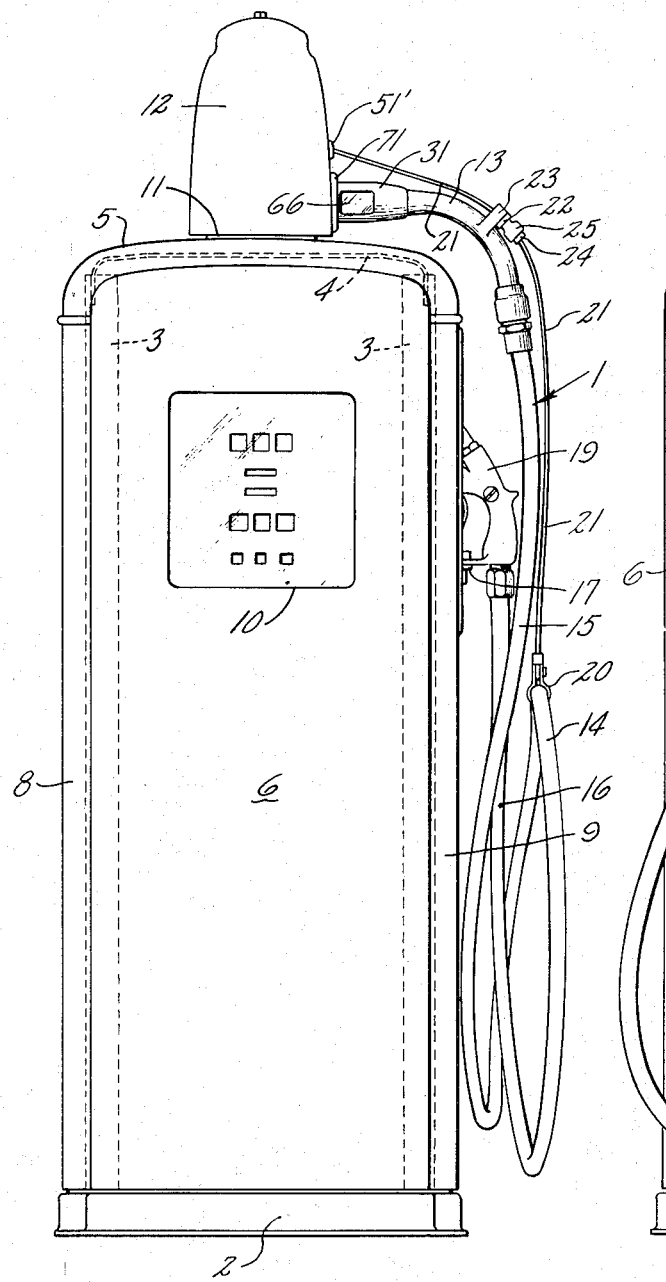
Fig. 1 is a small-scale exterior front elevational view of a gasoline dispensing pump showing a hose mounting means embodying the invention.
Figure 2:
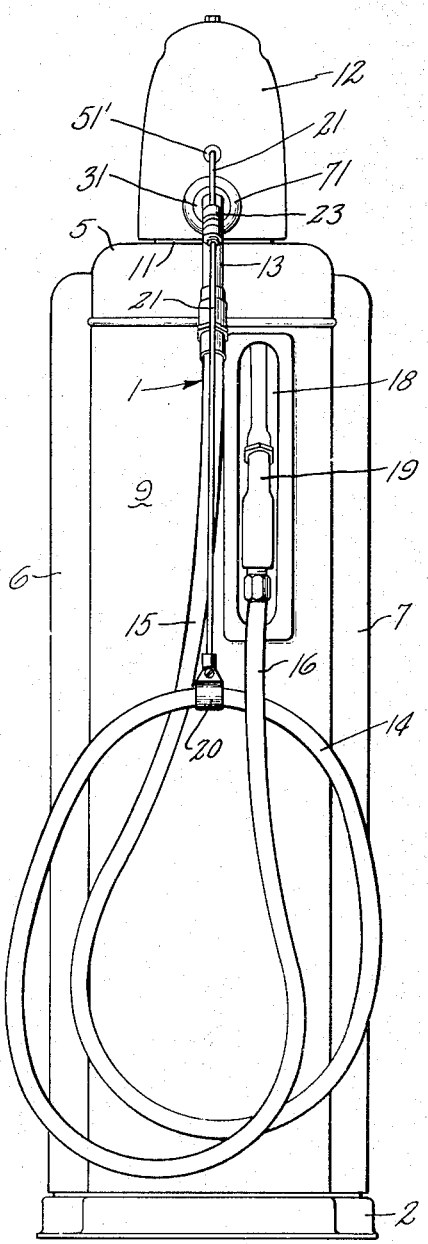
Fig. 2 is a small-scale exterior side elevational view thereof.

Referring to these drawings; Figs. 1 and 2 best show the manner in which the dispensing hose 1 is mounted on the housing of a fluid-dispensing apparatus. In this case, the apparatus chosen as an illustrative example, is a gasoline-dispensing pump. The pump, its actuating means, the meter, the register, and any accessories are enclosed within a suitable vertically-upstanding housing. The particular housing, herein shown, includes a frame, consisting of a base 2, four corner posts 3, fixed to and upstanding from the base, and a top support 4, which interconnects the upper ends of the corner posts and is suitably fixed thereto. The housing also includes sheathing elements such as the canopy 5, a front panel 6, a back panel 7 and side panels 8 and 9, respectively. These four panels enclose the space between the base 2 and canopy 5. Windows such as 10, are usually provided on the front and back panels 6 and 7 respectively to enable the quantity and/or cost indications of the register to be seen. On top of the pump housing is another housing which encloses a turret and consists of a base member 11, suitably fixed to canopy 5, and a hood 12, suitably fixed to and turning with the turret. The particular forms of housings described are not essential to the invention and may be varied, as desired.

The invention utilizes a tubular, fluid-conducting swing arm 13, having its inner end fixed to a suitable swivel or turret and receiving fluid therefrom. The turret in turn receives fluid from a fixed element of the fluid-dispensing conduit which is located within the housing, as will later appear. This swing arm rotates about the vertical axis of the turret, which axis in this illustrative example, coincides with the central vertical axis of the pump housing. The swing arm 13 extends radially outward above the top 5 of the pump housing and then curves downwardly terminating with an outlet end to which is secured the inlet end of the flexible dispensing hose 1. The arrangement is such that the arm 13 can swing on its vertical axis throughout a sufficient angular range to enable its outlet end to be positioned on any of the four sides 6, 7, 8 or 9 of the pump housing. In this illustrative example, the arm 13 can swing through an angle of 336°. More particularly, it can swing 168° in either direction from a normal rest position which is the position illustrated. This swing arm 13 is turned by means of a pull on the hose 1 and follows the hose, as the latter is pulled by the operator, into any desired position within the described angular range.

The invention also utilizes a hose, which is so long that it cannot, when the apparatus is not in use, be hung up in a single loop, as is frequently done and as is shown for example in Jacobs Patent No. 2,599,556, granted June 10, 1952. The hose is so long that it must be formed with a complete extra loop or coil, such as 14, between the stretch 15, which extends downwardly from the swing arm 13, and the stretch 16, which extends upwardly to the usual support 17 and boot 18 for the valved hose nozzle 19 that is fixed to the outlet end of hose 1. The midpoint of the hose is at the uppermost part of coil 14 and it is customary to connect to the hose at this point a clamp, 20, to which is attached a flexible cable 21 extending to some means which tends to hold the mid-point of the hose located, as shown, but enables such point to be moved outwardly in order to extend the servicing range of the hose, when desired, by pulling on the hose. Thus, the operator may remove the nozzle 19 from its support 17 and service a car, utilizing only half of the hose (that portion between the nozzle 19 and clamp 20) or, if the car is more remotely located, he can by pulling on the hose use some or all of the other half of the hose to get the extra length required.

According to this invention, all of the hose, except its nozzle end, which as usual is carried either by the support 17, when the apparatus is idle, or by the operator, during servicing, is suspended from the swing arm 13. Thus, the inlet end of the hose is fixed to and suspended from the outer end of the swing arm 13 and the mid-point of the hose is suspended by cable 21 from the swing arm. This cable is mounted on the swing arm for outward extension. In a preferred mounting, the cable extends along the swing arm to a suitable spring-actuated winding drum, which is suitably fixed to the turret, as will later be described in detail. The cable 21 extends through a ferrule 22 which has a drive fit in a lug 23 fixed to the arm 13, and the cable has suitably fixed thereto a collar 24, and, adjacent to the latter, carries a bumper 25 of rubber-like material. The spring-actuated winding drum will normally draw the collar 24 against bumper 25 and the latter against the ferrule 22, thus limiting the extent to which the mid-point of the hose can be drawn up and locating its normal rest position, which is that shown in Fig. 2. All of the hose can be carried to any of the four sides 6, 7, 8 or 9 of the pump housing as the arm 13 is swung about its vertical axis. The operator carries the nozzle 19, as usual, and, if he moves around the pump housing, the arm 13 will swing to follow him and, should extension of the hose be required, the operator simply pulls the hose outwardly, causing the cable 21 to be drawn outwardly. In such action, the swing arm will be in line with the hose as will also be the cable 21. Thus, the cable will always lie substantially in a vertical plane, which includes the radius of arm 13, and while it may bend from such plane there will never be sharp bends to the right or left, such as are common, where the retracting means is located inside the pump housing in fixed position and the cable passes through a hole in one side wall of the pump housing.

The turret above referred to, may be of any suitable construction that will enable the desired range of swinging movement of the tubular arm 13 and the transfer of fluid therethrough without leakage. One suitable turret construction is shown in Figs. 3 to 6. This turret consists of a hollow and generally cylindrical body 26, having its upper end closed by a head 27 (Fig. 3), which is clamped with an interposed gasket 28 to the upper end of the body by cap screws 29. This hollow body has a side outlet 30, through which liquid passes to the described tubular swing arm 13 and, in this case, through the intermediary of a sight-flow indicator casing 31. One end of the latter is clamped to turret 26 with an interposed gasket 32 (Fig. 3), these parts being fastened together by the cap screws 33 shown in Fig. 6. The lower end of the hollow turret body rests upon an annular bronze ring 34 (Fig. 3) which is mounted in a groove in the upper face of a suitably fixed supporting member 35 and serves as a thrust bearing. The member 35 has an upstanding hollow cylindrical tube 36 extending upwardly into a tubular bearing 37 fixed in the lower hollow cylindrical end of the turret 26. The upper end of the bore of bearing 37 is countersunk to receive an O-ring 38, which is compressed into sealing relation with the relatively rotatable parts 36 and 37 by means of a plate 39 actuated by a spring 40, having a seat 41 on the inner face of head 27. The turret is held to the annular ring 34 by a gib 42 (Fig. 5) secured by screws 43 to the support 35.

Figure 5:
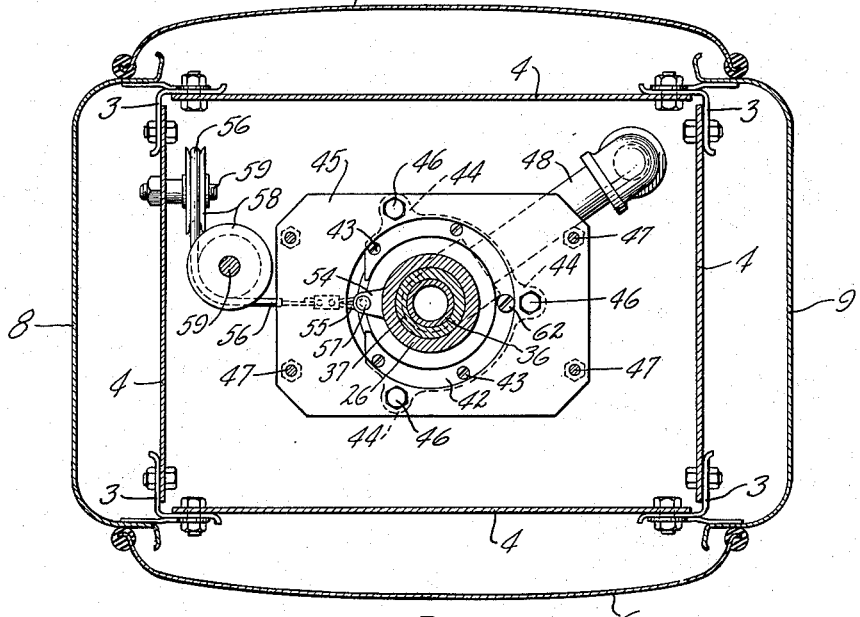
Fig. 5 is a sectional plan view taken on the line 5—5 of Fig. 3.

The latter has three angularly-spaced upstanding posts 44 the upper ends of which engage the lower face of a plate 45 (Fig. 6) and are clamped thereto by bolts 46. Plate 45 is fixed to the top support 4 by bolts 47 (Figs. 3, 4 and 5). The passage through tube 36 (Fig. 3) extends into the lower part of the support 35 and terminates with a side inlet to which is connected a pipe 48, which is part of the usual liquid-dispensing conduit supplied by the usual pump. It will thus be clear that the described swing arm 13 is supported from the pump housing for swinging movement around a vertical axis by means of the described turret and that liquid may be supplied to the arm and from the usual pump located within the housing, the parts 36, 37, 38, 39 and 40 forming a swivel pipe coupling which permits swinging of the arm without leakage of liquid between the relatively movable parts.

Figure 6:
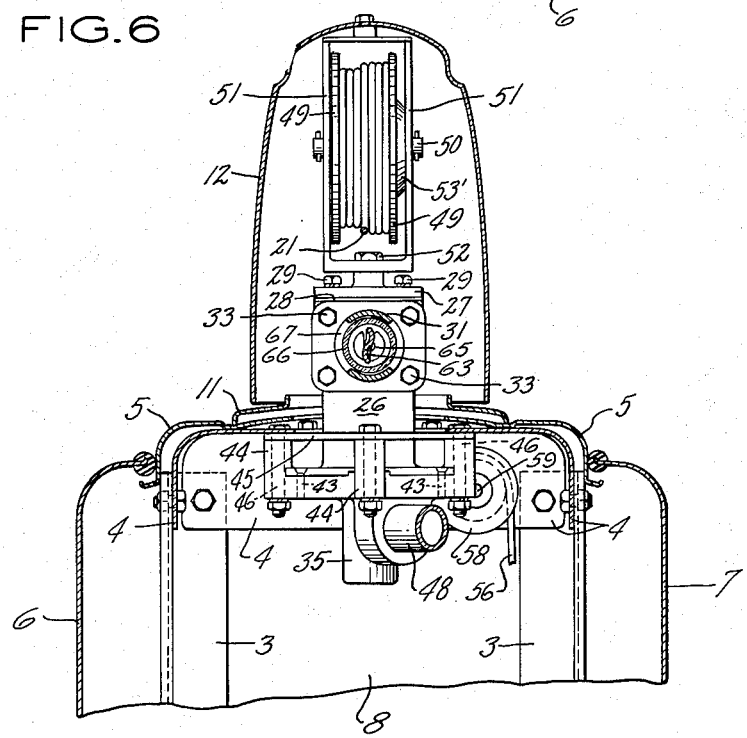
Fig. 6 is a fragmentary cross sectional view taken on the line 6—6 of Fig. 3.

The hose-retracting means, to which the described cable 21 is connected, may be of any suitable form. It should be carried by the swinging arm and, conveniently, by its inner end, which is the turret 26. The particular retracting means shown includes a drum 49 (Figs. 3 and 5) which is rotatably mounted on a horizontal shaft 50, the ends of which are supported one in each of two upstanding arms of a bracket 51. Bracket 51 rests on top of the head 27 of the turret and is fixed thereto by a screw 52. The cable 21 extends through a grommet 51' into the housing 12 and has a suitable length wound on drum 49. One end of the cable is suitably fixed to drum 49. A spiral spring 53 (Figs. 3 and 4), fixed at one end to the hub of drum 49 and at the other end to a pin 52' carried by a plate 53' fixed to bracket 51, tends to turn the drum in the direction necessary to wind up cable 21 and normally holds it retracted with the bumper 25 engaged with ferrule 22. The bracket 51, as indicated in Figs. 3 and 6, is used as a means for supporting the hood 12 from the turret.

The turret 26 is yieldably held in one normal rest position, which is such as to maintain the swing arm 13 and the portion of hose 1 that is supported thereby, positioned as illustrated. Any suitable means may be employed for this purpose. The means herein illustrated, is of the general type disclosed in my above-named patent. The drum-like lower end of turret 26 (Figs. 3 and 5) has fixed thereto a short crank 54, which is slotted to receive a loop 55 of a cable 56, such loop being held to the crank by a pin 57. This cable 56 is guided by pulleys 58, mounted on studs 59, fixed to the top support 4. These pulleys direct the cable to one corner of the housing and thence vertically downward for connection by a loop 60 (Fig. 3) to one end of a spring 61, the other end of which is fixed as indicated, to one of the corner posts 3. From Fig. 5, it will be clear that the spring 61, acting through cable 56 and crank 54, will turn the turret 26 into the illustrated rest position, in which the swing arm 13 and the coil 14 of hose suspended therefrom are located adjacent and centralized vertically with respect to the side panel 9. When the swing arm is moved out of this position in either direction, the crank 54 will pull on the cable 56 and the spring 61 will be extended. If the turret is turned far enough, part of the cable will be wound on the drum-like lower exterior of the turret. A stop screw 62 (Figs. 3 and 5), passing through gib 42 (Fig. 3) and threaded into the underlying support 35, limits by its engagement with crank 54 the extent of swinging movement of the turret and arm 13. As herein shown in Fig. 5, the movement of arm 13 is limited to an angle of 168° in either direction from the normal rest position or a total angular movement of 336°, which is ample for all desired servicing operations. Without this stop screw, one might turn the arm 13 more than one revolution and perhaps cause damage.

The particular flow indicator illustrated consists of a propeller-shaped blade 63 (Fig. 3), having trunnions 64 at its ends, mounted to turn in bearings 65, provided in the casing 31. This blade revolves inside a tube 66, which is made of suitable transparent material and is located in the casing 31, with portions visible through openings 67 in the casing. Tube 66 is held in place by an annular nut 68, which is threaded into the casing 31 near its entrance end and presses a gasket 69 against one end of the tube 66 and the other end of the tube against gasket 70, which in turn is pressed against a seat in the casing near the outlet end thereof. The cylindrical portion of casing 31 preferably emerges from the turret housing 12 through a grommet 71 of rubber like material.

In the operation of servicing a car, the operator removes the nozzle 19 from its support 17 and walks toward the fill opening of the tank of the car. Whatever the location of the car with relation to the pump housing, the swing arm 13 will move under the operator's pull on the hose and tend to swing until it and the hose lie approximately in a vertical plane which extends radially outward from the vertical axis of the swing arm. And the swing arm turns very easily, a force of only a few pounds being sufficient to move it the maximum amount permitted and lesser forces sufficing for lesser degrees of swinging movement. If the operator has to move from the side 9 to another side, such as 6 or 7 and on some occasions still further to side 8, the entire body of the hose moves around the pump housing, avoiding the rubbing of the hose on the corners of the pump housing that might otherwise occur and the resulting increase in the force necessary to pull the hose and wear on the housing. So also, the suspension cable 21 follows along with the swing arm 13 and hose 1 and no sharp bends are created therein. When the swing arm 13 has been moved in the desired direction and, if the first section of the hose (the part 16 and half of loop 14) is sufficient to reach the fill opening of the tank, the nozzle 19 is inserted in such opening and the tank services in the usual way. If the first section of the hose is not long enough to reach the tank, then the operator increases his pull on the hose to extend the latter by unwinding the coil 14 to the necessary extent, the cable 21 being extensible outwardly because of the yielding of the retracting spring 53. In thus extending the hose, the pull on the same will be directed radially of the pump housing and the cable 21 will not have to bend around a corner of the pump housing or caused to make any sharp bend, such as would increase the pull necessary to move it or increase the rate at which it wears. On completion of the servicing operation, the operator removes the nozzle 19 from the fill opening of the tank and walks back to the pump. If the hose had been extended then the cable 21 will be retracted by spring 53 to draw the hose into the loop or coil 14 and thereafter the spring 61 will turn the turret 26 and thus arm 13 until the latter assumes the normal position illustrated in Fig. 2, where the hose arm 13 and cable 21 are symmetrically located with respect to the vertical center line of the side 9 of the pump housing. Then, the pump is stopped in the usual way and the nozzle 19 is hung up on the support 17.

The invention overcomes the objection to the so-called swing-arm type of pump by providing for extension of the hose beyond the normal and usual length that can be mounted in a single loop on one of the sides of the pump housing. This provides the extra hose that is occasionally necessary in order to reach the cars that stop outside the usual service range. Also, the invention overcomes the objections to that form of hose-extension means, which involves a loop or coil, such as 14, held in such form by a wire cable, acted on by a retracting means, such as a weight or spring, located inside the pump housing. The two points of attachment to the hose, the inlet end and the mid-point are movably bodily around the pump housing to any side thereof, as against the prior practice, where the inlet end of the hose was fixed to one side of the pump housing and the hose-retracting cable passed through a hole in said side of the pump housing to a retracting means mounted at a fixed location inside the pump housing. With this invention, the cable 21 moves with the swing arm 13 and is mounted for outward extension relatively thereto and the means, which retract the cable after its extension, is preferably also carried by and movable with the swing arm. The arrangement enables all of the hose to be usefully utilized in reaching a tank to be serviced. That is, all of the hose can be drawn out in a straight line path from the center of the pump housing to the fill opening of the tank. In those prior art pumps, in which the inlet to the hose is fixed to one side of the pump housing, it may be necessary to wrap the hose around one or more sides of the pump housing in order to get the desired radial direction and, in such a case, the radial reach is diminished by the length of the hose that is wrapped around the pump.

Thus, the invention affords an improved mounting for the flexible hose of a liquid dispensing apparatus, such as a gasoline dispensing pump, and enables the fuel tanks of cars to be easily reached and serviced from all sides of the pump housing and easy extension of the hose, when required, to reach the occasional cars that stop outside the normal servicing range.

What is claimed is:

1. In a fluid dispensing apparatus, having a housing consisting of a top wall, a bottom wall and upright side walls enclosing the space between the top and bottom walls, a turret mounted on the housing for rotation about a vertical axis, a rigid tubular arm fixed at one end to said turret and extending outwardly therefrom over and above the top wall and terminating with an outlet end, spaced radially from said axis by a distance greater than the radial distance from said axis to the most remote portion of any side wall, whereby in all positions of rotation of said arm about said axis the outlet end of the arm will be spaced outwardly away from the side walls of the housing, means for supplying fluid through said turret to and through said arm, a hose having one end connected in fluid-receiving relation to the outlet end of said arm, a nozzle on the other end of the hose, a support on one said side wall for the nozzle when not in use, said hose having a portion intermediate its ends wound into a coil and extending from the outlet end of said arm downwardly to said coil and then upwardly from said coil to said support, a flexible member extending along said arm to the outer end thereof and then downwardly to the upper mid-point of said coil and fixed thereto; and yieldable means bodily movable with said arm for drawing said member inwardly along said arm to elevate said mid-point and hold the latter in a predetermined position, said nozzle when removed from said support being movable by the operator around the housing to any side wall thereof causing said arm to turn and bodily move the entire hose out of contact with the side walls of the housing, said nozzle also being movable by the operator outwardly away from the housing and radially of said arm to unwind said coil and extend the hose exerting a pull on said flexible member that is directed radially of said arm.

2. In a fluid dispensing apparatus, having a housing consisting of a top wall, a botton wall and upright side walls enclosing the space between the top and bottom walls, a turret mounted on the housing for rotation about a vertical axis, a rigid tubular arm fixed at one end to said turret and extending outwardly therefrom over and above the top wall and terminating with a down-turned outer and outlet end spaced radially from said axis by a distance greater than the radial distance from said axis to the most remote portion of any side wall, whereby in all positions of rotation of said arm about said axis the outlet end of the arm will be spaced outwardly away from the side walls of the housing, means for supplying fluid through said turret to and through said arm, a hose having one end connected in fluid-receiving relation to the outlet end of said arm, a nozzle on the other end of the hose, a support on one said side wall for the nozzle when not in use, said hose having a portion intermediate its ends wound into a coil and extending from the outlet end of said arm downwardly to said coil and then upwardly from said coil to said support, a flexible member extending along said arm to the outer end thereof and then downwardly to the upper mid-point of said coil and fixed thereto; and yieldable means movable with said arm tending to draw said member inwardly along said arm and elevate said mid-point to a predetermined position, said nozzle when removed from said support being movable by the operator around the housing to any side wall thereof causing said arm to turn and bodily move the entire hose out of contact with the side walls of the housing, said nozzle also being movable by the operator outwardly away from the housing and radially of said arm to unwind said coil and extend the hose exerting a pull on said flexible member that is directed radially of said arm.

3. The combination as claimed in claim 2, in which stops are fixed one on said arm and one on said member, said stops being normally held in engagement by said means and limiting the upward movement of said member and maintaining said mid-point in a predetermined vertical position.

References Cited in the file of this patent

UNITED STATES PATENTS

| | | |
|---|---|---|
| 2,340,217 | Grise | Jan. 25, 1944 |
| 2,358,635 | Grise | Sept. 19, 1944 |
| 2,564,623 | Harks | Aug. 14, 1951 |